Figure 1:
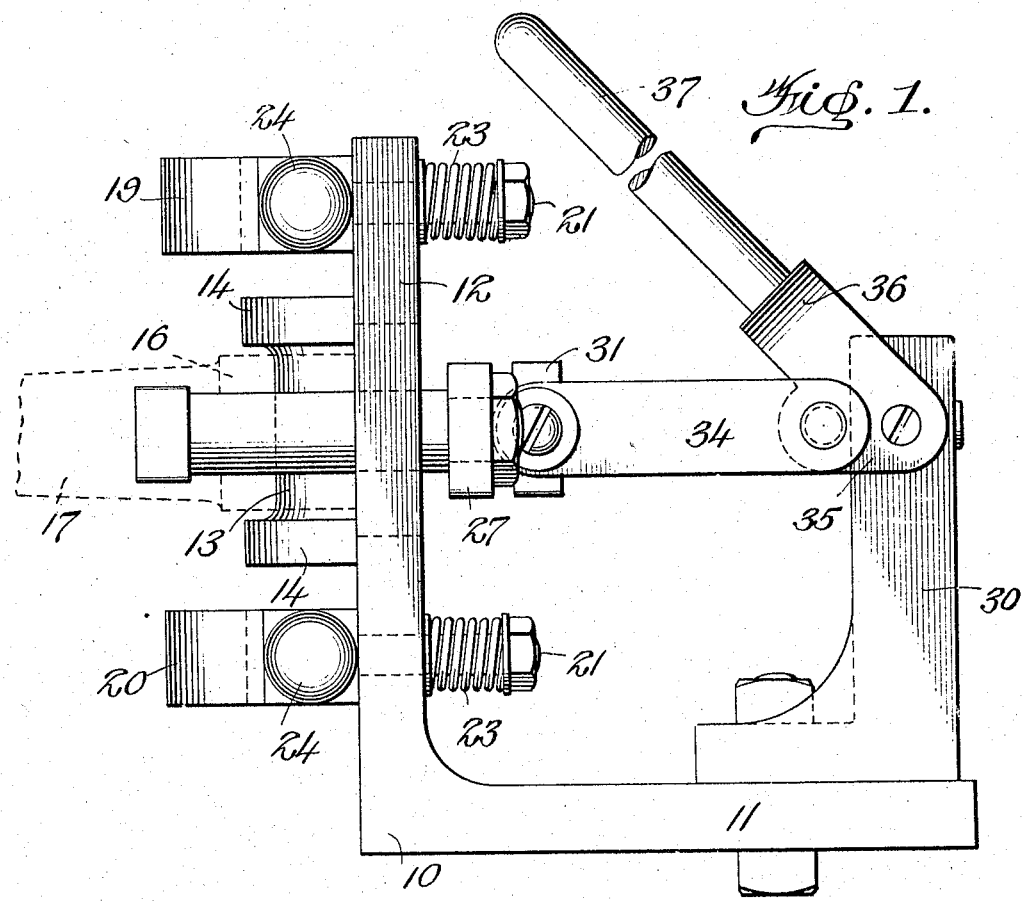

Nov. 11, 1924.

E. A. WATKINS

MOLDING MACHINE

Filed Feb. 6, 1923

1,515,002

2 Sheets—Sheet 1

Inventor
E. A. Watkins,
by Bright & Riley
Attorneys

Nov. 11, 1924.　　　　　　　　　　　　　　　　　　1,515,002
E. A. WATKINS
MOLDING MACHINE
Filed Feb. 6, 1923　　　　2 Sheets-Sheet 2

Inventor
E. A. Watkins,
By Bright & Bailey
Attorneys

Patented Nov. 11, 1924.

1,515,002

UNITED STATES PATENT OFFICE.

EVERETTE A. WATKINS, OF WICHITA, KANSAS, ASSIGNOR TO THE WATKINS MANUFACTURING COMPANY, OF WICHITA, KANSAS, A CORPORATION OF KANSAS.

MOLDING MACHINE.

Application filed February 6, 1923. Serial No. 617,260.

*To all whom it may concern:*

Be it known that I, EVERETTE A. WATKINS, a citizen of the United States, and resident of Wichita, in the county of Sedgwick and State of Kansas, have invented certain new and useful Improvements in Molding Machines, of which the following is a specification.

My invention relates to molding apparatus and has particular reference to an improved machine for use in casting babbitt or like metal bearings in connecting rods and other machine elements, my purpose being to provide a simple mechanism for this purpose which may be operated with precision and dispatch to the end of producing a maximum amount of work in a minimum amount of time and with the least expense.

More particularly it is my purpose to provide a machine of the kind mentioned that, without adjustment and by the same movements of an operating device, is capable of handling with equal facility pieces of work of different sizes; that includes mechanism operable to positively eject work from the machine; that is of simple construction, possessing few parts compactly arranged and unlikely to get out of order, and that is thoroughly reliable and efficient in use.

With the foregoing and other purposes in view, my invention consists in the novel features of construction, combination and arrangement of parts as will be hereinafter more fully described, illustrated in the accompanying drawings and defined in the appended claims.

In the drawings wherein like characters of reference denote corresponding parts in the different views.

Figure 2:
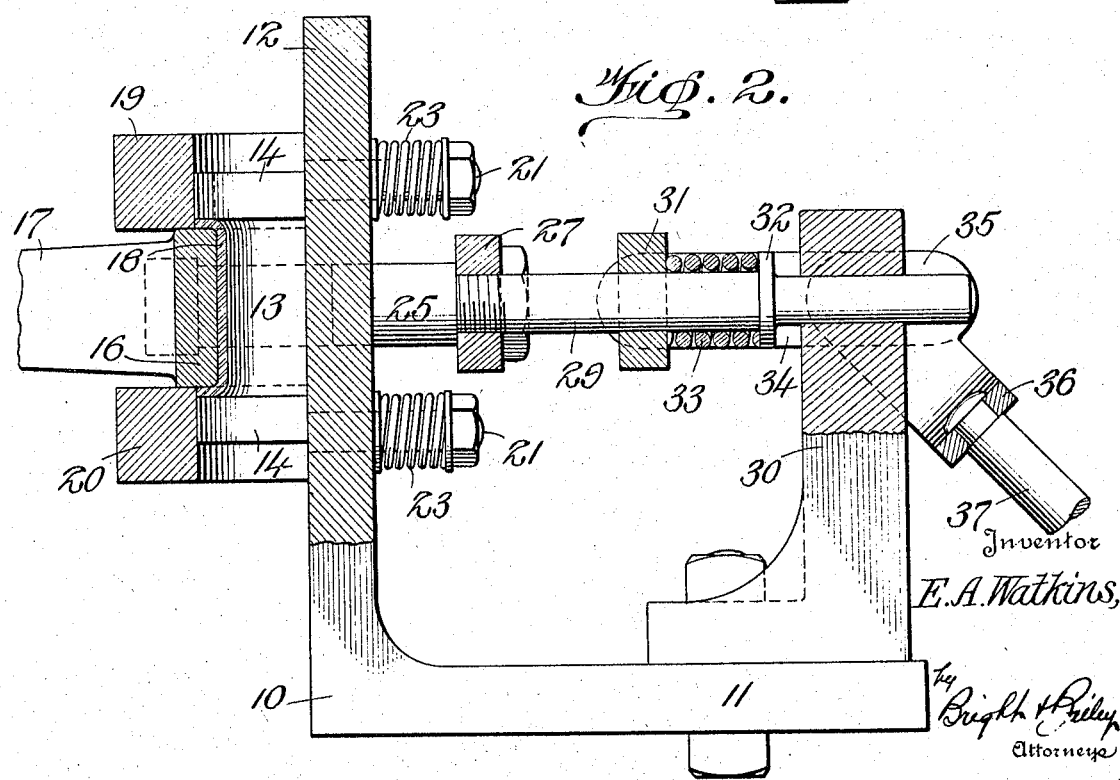
Figure 3:
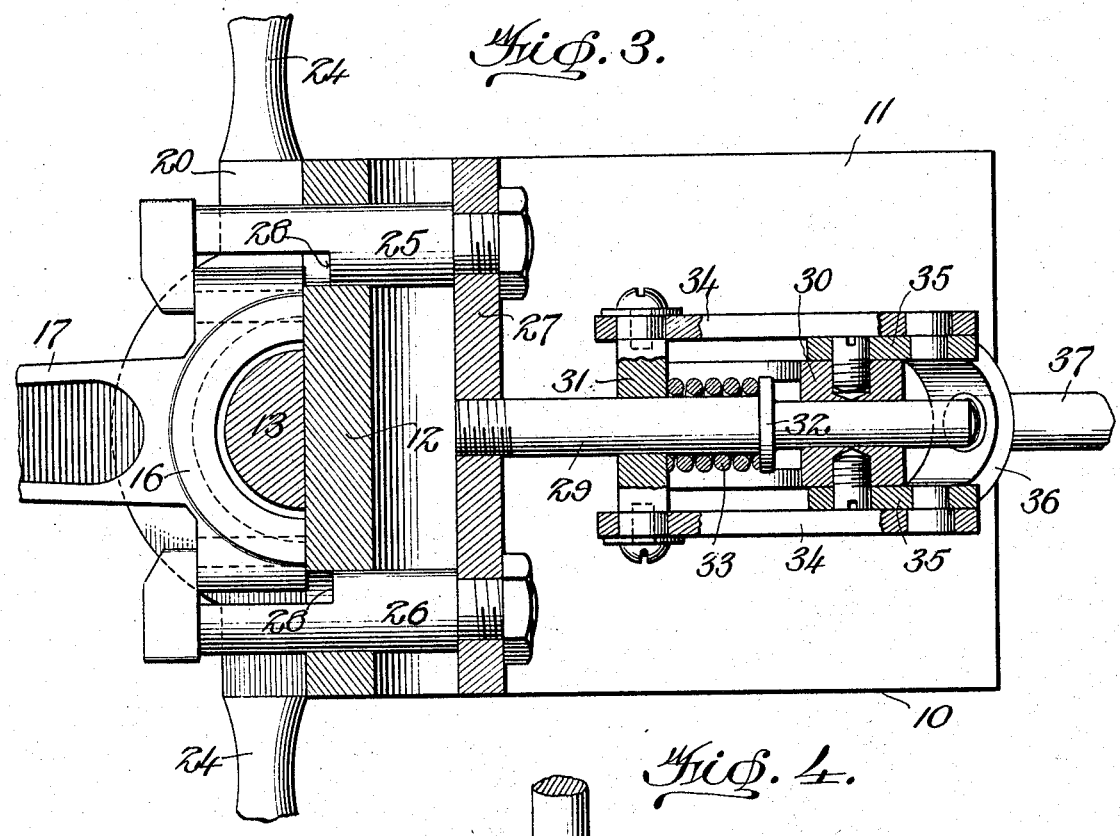

Figure 1 is a side elevation of my improved machine showing the parts thereof in normal or released position;

Figure 2, a central vertical section through the machine showing the parts thereof disposed in operative relation to a connecting rod and a bearing formed in the latter;

Figure 3, a horizontal section on the line 3—3 of Figure 2; and

Figure 4:
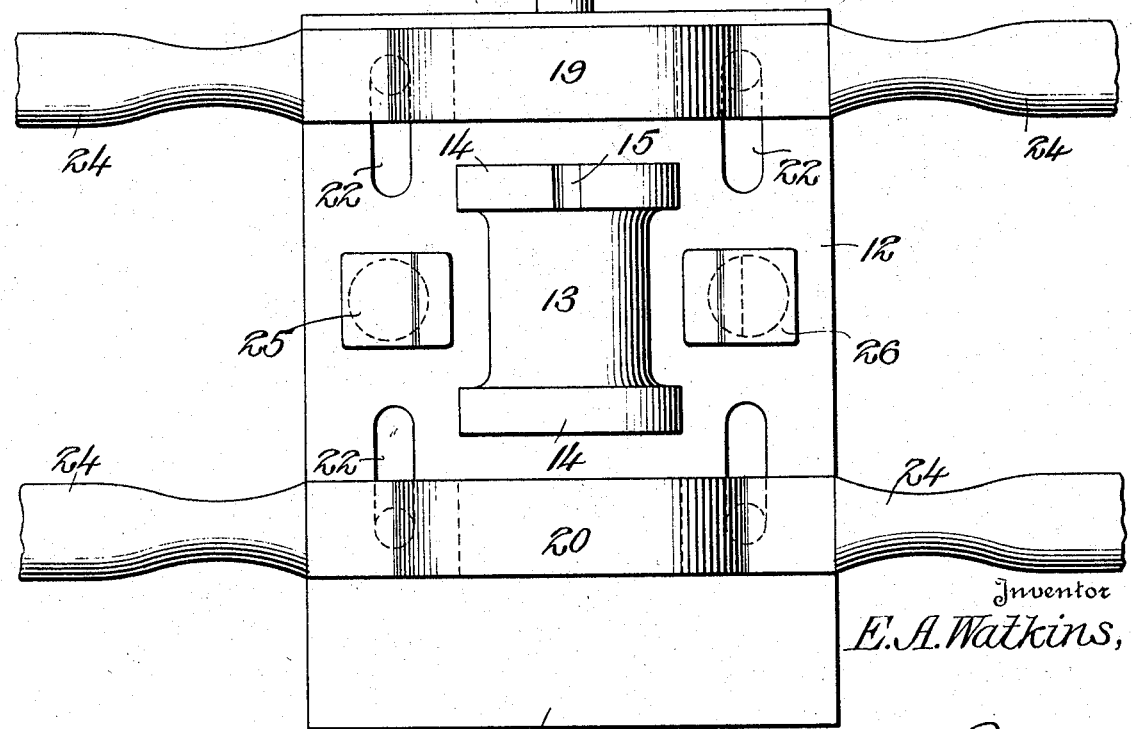

Figure 4, a front elevation of the machine as shown in Figure 1.

Referring now to the drawings in detail, 10 designates a base plate, the same preferably including bottom and end portions 11 and 12, respectively, the former of which is horizontally disposed and is adapted to be secured to a fixed support such as a work bench, while the latter is vertically disposed and carries on its outer face a die 13.

The die 13 is of semi-cylindrical shape and is provided at its ends with flanges 14 that extend outwardly beyond its intermediate body portion, one flange, the upper, being provided with one or more recesses or openings as indicated at 15 for a purpose that will later appear.

The distance between the flanges 14 is slightly greater than the width of the end portion 16 of a connecting rod 17 that is adapted to be supplied with a bearing, and likewise the body portion of the die is formed slightly smaller than the bearing receiving recess in the end of the connecting rod, so that when the latter is properly positioned with respect to the machine, by being placed over the die with its inner end against the outer face of the portion 12 of the base plate it will be spaced both intermediately and at its sides from the body portion, and the end flanges, respectively, of the die. The space thus provided is adapted to receive molten metal that may be poured through the opening or openings 15 in the upper flange 14 whereby a bearing 18 is formed corresponding in size and shape to said space.

In order to close the ends of the babbitt receiving space between the die 13 and a connecting rod that has been operatively positioned with respect to said die I have provided, a pair of members 19 and 20, one of which is normally disposed above and the other below the die. Each of these guide members is provided with a pair of pins or studs 21 that extend through vertically disposed slots 22 in the portion 12 of the base plate and that between the rear face of the portion 12 and nuts or other stops thereon, are surrounded by coil springs 23 that exert a force acting to draw the member into engagement with the outer face of the portion 12, and as a consequence, act to frictionally retain the member in any vertically adjusted position within the limits permitted by the extent of the slots 22. A semi-circular recess is formed in each member 19 and 20 of a size corresponding substantially to the size of the flanges 14 of the die and said members are so disposed on the base plate that their recesses are alined with the flanges 14 of the die, so that when the members are moved relatively towards one another, they will enclose the flanges 14. Consequently, when a connecting rod is in place against the base plate, as shown in Figure 2, and the members 19 and 20 are moved relatively inward from the position of Figure 1 to the position of Figure 2, they will contact with the sides of the connecting rod and thus serve to completely close the space between the rod and the die and thus define the limits of the flange portions of the bearing that is formed when said space is supplied with molten metal. Handles 24 are provided on each member 19 and 20, so that they may be conveniently manipulated.

My improved machine includes mechanism for clamping and holding a connecting rod against the base plate in operative relation to the die 13 during the formation of a bearing, and for positively ejecting the connecting rod from the machine after the bearing has been completed and the clamping force on the rod has been removed. This mechanism includes a pair of dogs 25 and 26 in the form of headed pins located one to either side of the die 13 and slidable through openings in the vertical portion 12 of the base plate. These pins are mutually connected at their inner ends by a bar 27 and their adjacent faces towards their outer headed ends are cut away to provide shoulders 28. Their heads are engageable with a connecting rod as shown in Figure 3 to clamp the same against the base plate when inward movement is imparted to the bar 27, and as will be observed, the shoulders 28 underlie certain portions of the connecting rod when it is clamped against the base plate, so that when the bar 27 is moved outwardly to release the rod, said shoulders engage with and positively force the rod away from the die and out of operative relation to the machine.

Extending rearwardly from the bar 27 is a rod 29 that is slidable through a standard 30 rising from the bottom portion 11 of the base near its rear end. On this rod is slidably mounted a block 31 and between said block and a flange 32 on the rod that is located rearwardly of the block is arranged an expansion coil spring 33 that constantly reacts from the flange to project the block forward. A pair of links 34, 34 are pivoted respectively at their forward ends to the sides of the block 31 and at their rear ends are pivoted respectively to a pair of relatively short links 35, 35 that in turn are pivotally connected to the standard 30 and are mutually connected by a yoke 36, which latter is provided with a handle 37, whereby the links 35, 35 may be rotated to project and retract the links 34, 34 by a toggle action as is apparent. By this arrangement it thus is apparent that when the handle 37 is swung forwardly to the position of Figure 1, the links 34, 34 will correspondingly be projected forward and contact at their forward ends with the bar 27 and thus serve to move said bar forward and with it the dogs 26 to effect release of a connecting rod held by said dogs against the base plate, and at the same time, through the shoulders 28, effect the positive ejection of a connecting rod from the machine. On the other hand, when a connecting rod is disposed operatively with respect to the dogs 26 and the handle 37 is swung to the rear, rearward movement will be imparted to the block 31 through the links 34, 35 and as a consequence, the spring 33 will be compressed against the flange 32 with the result that the rod 29 and with it the dogs 26 will be drawn rearwardly, whereby the connecting rod will be clamped against the base plate. From this arrangement it is apparent that equal movements of the operating handle may result in unequal movements of the clamping dogs. In other words, because of the interposition of the spring 33 between the flange 32 on rod 29 and the block 31 which is slidable on said rod, a yieldable connection is provided between the operator, consisting of handle 37, yoke 36, links 34 and 35 and block 31, and the bar 27 carrying the dogs 25 and 26, to the end that connecting rods or other pieces of work of different sizes may be clamped against the base plate by the same movements of the operator.

From the foregoing description considered in connection with the accompanying drawings, it is believed that the construction, operation and advantages of my improved machine will be apparent. It is to be understood, however, that various changes and desirable additions in and to the machine as herein illustrated and described may be resorted to without departing from its spirit or scope as defined in the appended claims.

I claim:—

1. A machine of the character described comprising a base plate, a die thereon, and means for clamping a piece of work against said base plate in operative relation to said die comprising a pivoted lever, a dog engageable with the work, and a yieldable connection between said dog and said lever.

2. A machine of the character described comprising a base plate, a die thereon, a pair of dogs reciprocable through the base plate and including means engageable with a piece of work to be clamped against the base plate in operative relation to said die, a bar connecting said dogs, a shouldered rod extending from said bar, a block slidable on said rod between the shoulder thereof and the bar, an expansion spring between said shoulder and said block, and means for moving comprising fastening devices extending through said tubular member and fixed in said wood strips.

7. A yarn tube frame comprising a rectangular tubular member, a soft filler for said member comprising reversely disposed tapered wood strips fitted within said member, a plurality of yarn tubes, and means to secure said tubes to said member, said means comprising fastening devices extending through said tubular member and entering said filler from two adjacent sides of said member.

8. A yarn tube frame comprising a rectangular tubular member, a soft filler for said member comprising reversely disposed tapered wood strips fitted within said member, a plurality of yarn tubes, and means to secure said tubes to said member, said means comprising fastening devices extending through said tubular member and entering said filler from two adjacent sides of said member and certain of said fastening devices extending into more than one filler strip and preventing longitudinal displacement thereof.

9. A yarn tube frame comprising a metal tubular member with walls of substantial thickness, a plurality of yarn tubes, a series of plates to which said tubes are secured in relatively small groups, and fastening devices extending transversely through said plates and tubular member and secured therein.

10. A yarn tube frame comprising a metal tubular member with walls of substantial thickness, a plurality of yarn tubes, a series of plates to which said tubes are permanently secured in relatively small groups, and fastening devices extending through said plates and tubular member and secured therein, said member having countersunk openings and said plates having portions displaced into said openings by said fastening devices and being thereby held from lateral displacement.

In testimony whereof we have hereunto affixed our signatures.

GEORGE P. FINDLAY.
GEORGE D. LOCKWOOD.
JOHN G. SODERBERG.